(12) United States Patent
Kefferstein et al.

(10) Patent No.: US 6,447,590 B1
(45) Date of Patent: Sep. 10, 2002

(54) TREATMENT COMPOSITION BASED ON PREGELATINIZED STARCH AND PROCESS FOR APPLYING IT TO A METAL, ESPECIALLY STEEL, SURFACE

(75) Inventors: Ronald Kefferstein, Saint Victoret; Lothaire Scherer, Fos-sur-Mer, both of (FR)

(73) Assignee: Usinor, Puteaux (FR)

( * ) Notice: Subject to any disclaimer, the term of this patent is extended or adjusted under 35 U.S.C. 154(b) by 24 days.

(21) Appl. No.: 09/645,445

(22) Filed: Aug. 25, 2000

(30) Foreign Application Priority Data

Aug. 26, 1999 (FR) .............................. 99 10832

(51) Int. Cl.$^7$ .......................... C09D 103/00; C09D 5/08
(52) U.S. Cl. ................ 106/14.41; 106/14.22; 106/14.24; 106/14.34; 106/14.35; 106/14.36; 106/14.37; 106/14.42; 106/206.1; 106/216.1
(58) Field of Search .................. 106/14.34, 14.41, 106/14.42, 206.1, 216.1, 14.22, 14.24, 14.35, 14.36, 14.37

(56) References Cited

U.S. PATENT DOCUMENTS 2,598,170 A    5/1952    Huebotter

FOREIGN PATENT DOCUMENTS

| FR | 88.484 | | 4/1967 |
| FR | 2377772 A | * | 9/1978 |
| JP | 4-318074 | | 11/1992 |
| JP | 10-212445 | | 8/1998 |
| WO | WO 97/12946 | | 4/1997 |

* cited by examiner

*Primary Examiner*—Anthony J. Green
(74) *Attorney, Agent, or Firm*—Sughrue Mion, PLLC

(57) ABSTRACT

An aqueous composition containing at least 2% by weight of pregelatinized starch and, as an emulsion, at least 1% or vegetable wax or oil, preferably chosen from carnauba wax, jojoba oil and candelilla wax. Also a process for applying a layer of this composition and in drying it so as to obtain a dry film having; a surface density of between 1 and 2.5 g/m$^2$. Treating a metal surface with the composition provides temporary corrosion protection and prelubrication.

19 Claims, No Drawings

TREATMENT COMPOSITION BASED ON PREGELATINIZED STARCH AND PROCESS FOR APPLYING IT TO A METAL, ESPECIALLY STEEL, SURFACE

The invention relates to the field of compositions for the treatment of metal surfaces, intended to provide both a prelubricating effect and a temporary corrosion protection effect.

The prelubricating effect is characterized by an improvement in the tribological properties of the surface treated in this way and then oiled in a conventional manner; this effect is beneficial for facilitating the forming operations, for example drawing operations.

The corrosion protection effect is temporary in the sense that a simple cleaning of the treated surface allows the treatment layer to be removed; this ability to be cleaned is important, for example when preparing to paint the surface.

These metal surface treatments are generally carried out in two steps:
application of a liquid homogeneous layer of the treatment composition on the surface;
drying of the layer applied, suitable for removing almost all of the liquid water from this layer, at a low enough temperature to avoid any deterioration of the treatment components.

The so-called "dry" film that is obtained may then also contain large amounts of water included in the composition of the film (as water of hydration, for example).

Compositions are sought which can be applied homogeneously as thin films and are effective with a low surface density; the desired surface density, measured in the dry state, is then generally less than 2.5 g/m$^2$.

Conventionally, these surface treatment compositions comprise, as essential components in solution or in emulsion, at least one sufficiently film-forming binder, at least one lubricant and at least one surfactant for promoting film spread over the surface to be treated.

In the case of an emulsion, the emulsifiers used generally have a surfactant effect promoting film spread.

These treatment compositions generally furthermore comprise corrosion inhibitors which may also have a surfactant effect.

The invention relates more particularly to the field of compositions for treating a metal surface, which comprise a binder based on pregelatinized starch and are intended to form a homogeneous dry film on this surface.

Pregelatinization of the starch is a specific operation, carried out by the producer, which destroys the crystalline structure of the starch granule and reduces the hydrogen bonds responsible for this structure. This operation is carried out, at approximately 100° C., by rolling or extension. Pregelatinized starch is then obtained which is in the form of a powder. It is this operation, known per se, which allows the (partially gelatinized) starch to be soluble in cold water and allows low-viscosity solutions to be obtained. This pregelatinization operation will make it possible to control (particularly with regard to viscosity) the phenomena of gelatinization or gelling in the presence of water.

Starch is essentially a homopolymer of D-glucose (highly hydroxylated glucosyl monomer) composed mainly of a mixture of two types of polymer:
amylose, an essentially linear molecule, capable of complexing hydrophobic molecules such as fatty acids, able to react with emulsifiers and known for its film-forming properties—T(melting)≈120° C.;
amylopectin, an essentially branched molecule having a very high molecular mass ($10^7$ to $10^8$)—T(melting) ≈45° C.

The amylose content of the starch depends on its plant origin, as indicated in Table I: certain genetically modified varieties may give starches richer in amylose.

TABLE I

Average amylose contents of various starches

| Plant origin of the starch | Amylose content (%) |
|---|---|
| Normal maize | 28% |
| waxy maize | <1% |
| Maize "rich in amylose" | 65–70% |
| Corn | 25–28% |
| Potato | 19–22% |
| Waxy potato | <1% |
| Smooth pea | 33–35% |

The binding effect of the pregelatinized starch results from chemical mechanisms described below.

The water absorption by the starch grains is manifested by a reversible swelling of the amorphous part and the formation, firstly, of interchain hydrogen bonds; secondly, the water acts as a plasticizer which allows alignment of the crystallites by extension of the inter-crystalline amorphous phases and a large part of the absorbed water is then bound to the structure: at least 30% water is necessary for the plasticization to occur; the plasticization lowers the glass transition temperature (of the amorphous part).

A pregelatinized starch gel can then be described as a discontinuous phase composed of swollen starch granules enriched with amylopectin dispersed in a continuous phase of dissolved amylose.

Among the various products coming from the pregelatinization of starches, there are, among others:
fluid starches;
crosslinked starches;
dextrins, which are linear or branched oligosaccharides generally containing from 5 to 10 glucosyl units;
starch esters, such as starch acetates or phosphates;
starch ethers, such as O-alkyl starch ethers.

To achieve these various products coming from the gelatinization of starches, various modification means are used, such as "enzymatic" modifications, "depolymerization" modifications and chemical "crosslinking", "substitution", "dextrinization" or "saccharification" modifications.

Document FR 2,508,051 (ROQUETTES) describes (see especially claim 13) a surface treatment composition, especially for temporary corrosion protection, comprising, with respect to the dry matter:
from 30 to 95% of an extruded waxy starch;
from 1 to 25% of a plasticizer;
from 0.5 to 5% of a surfactant or wetting agent.

According to that document (page 5, lines 17–32), the plasticizer added to the starch-based composition makes it possible to prevent crazing and flaking of the film resulting from the treatment; this plasticizer is chosen from the group comprising not only sorbitol, a polyethylene glycol or glycerol, but also glucose syrups, lactates, gluconates, emulsifiable waxes, urea, thiourea and nitrates.

According to that document (page 6, lines 2 et seq), for effective temporary protection in wet environments, the treatment composition must also contain a resin or an insolubilising or crosslinking agent, generally 2 to 30%, such as resorcinol-formaldehyde or cyanamid-formaldehyde; consequently, the film resulting from the treatment is at least partially crosslinked, thereby impairing its ability to be cleaned.

According to that document (page 7, lines 27–28), the surface treatment composition may also contain anti-rust agents, that is to say a corrosion inhibitor.

That document describes the application of this composition to steel surfaces (example 1), but, in order to obtain effective corrosion protection, the surface density to be applied must be very high, namely 100 g/m$^2$ on page 16 and 200 g/m$^2$ on page 19.

The object of the invention is to provide a surface treatment composition which is effective at much lower surface densities, both for temporary corrosion protection and for prelubrication; the object of the invention is to provide an easily cleanable surface treatment composition.

For this purpose, the subject of the invention is an easily cleanable aqueous composition for treating a metal, especially steel, surface, characterized in that it comprises, as an emulsion, at least 2% by weight of pregelatinized starch and at least 1% of vegetable wax or oil, or at least 1% of synthetic oil or wax of equivalent chemical nature.

Using specifically an emulsified plant-based oil or wax in the treatment composition based on pregelatinized starch it is thus possible, according to the invention, to obtain both effective corrosion protection in a wet atmosphere and a prelubricating effect, even if this composition is applied as a thin film and without a crosslinking agent, so as to be easily cleanable.

The invention may also have one or more of the following characteristics:
- the said starch is crosslinked;
- the said starch is a potato or maize starch;
- the amylose content of the said starch is less than or equal to 25%;
- the pH of the composition is between 6.5 and 8;
- the weight content of pregelatinized starch is less than or equal to 7% and the weight content of oil or wax in the said composition is less than or equal to 5%;
- the said vegetable wax or oil is chosen from the group comprising carnauba wax, jojoba oil, candelilla wax and mixtures thereof;
- the composition also comprises at least one corrosion inhibitor, preferably chosen from the group comprising an alkylamine carboxylate, a hydroethyl-alkylene-imidazoline and mixtures thereof;
- the said corrosion inhibitor is a mixture of an alkylamine carboxylate and a hydrotheyl-alkylene-imidazoline, preferably in a proportion of approximately 2:1.

The subject of the invention is also a process for treating a metal surface using a composition according to the invention, comprising the steps consisting in applying a layer of the said composition to the said surface and then in drying the said layer so as to obtain a dry film, characterized in that the surface density of the said dry film is between 1 and 2.5 g/m$^2$.

Preferably, the said metal surface is a steel surface.

Finally, the subject of the invention is the use of this process for the temporary corrosion protection and/or pre-lubrication of the said surface.

The invention will be more clearly understood on reading the description which follows, given by way of non-limiting example.

The surface treatment compositions according to the invention are prepared in the following manner:
- dissolving pregelatinized starch in water;
- independently, using suitable emulsifiers, such as ethoxylated fatty alcohols, emulsifying the plant-based wax or oil in water;
- mixing the pregelatinized starch solution with the aqueous emulsion obtained;
- where appropriate, adding other components, such as corrosion inhibitors, to the mixture.

As plant-based wax or oil, it is preferred to use carnauba wax, jojoba oil or candelilla wax.

The carnauba wax comes from a *Corypha Cerifera* palm; it is essentially composed of a triglyceride of cerotic acid; the melting point of this triglyceride is very high, namely 80 to 85° C.; cerotic acid is a $C_{26}$ saturated fatty acid.

Jojoba oil is a liquid wax contained in a high proportion (45 to 60%) in the seeds of a *Simmondsia Chinensis* shrub which grows naturally in semi-desert regions (North Mexico, Arizona, Texas); it consists of aliphatic esters based on mono unsaturated fatty alcohols and fatty acids, mainly comprising eicosenoate of eicosenol and docosenol ($C_{19}H_{37}COO$—$C_{20}H_{39}$, $C_{19}H_{37}COO$—$C_{22}H_{43}$); its melting point is between 6 and 7° C.; this oil does not easily become rancid.

Candelilla wax comes from *Euphorbia Cerifera* and *Pedilantus Pavonis* shrubs which grow naturally in the north of Mexico and in the south of Texas; approximately half of it consists of hydrocarbons, mainly hentricontane $C_{31}H_{64}$ and the other half consists of a mixture of fatty acids, of aliphatic and triterpene alcohols and of their esters; its melting point is between 60 and 70° C.

The surface treatment compositions are prepared so as to obtain the following weight proportions of the main components:
- 2 to 7% pregelatinized starch;
- 1 to 5% oily or waxy phase.

Preferably, corrosion inhibitors are also added to these compositions: preferably an alkylamine carboxylate and/or a hydroethyl-alkylene-imidazoline are used; hydroethyl-alkylene-imidazolines are described in document EP 651,074 (PETROLITE).

In this case, the proportions by weight of these inhibitors in the treatment composition are preferably as follows:
- 0.5 to 3% alkylamine carboxylate;
- 0.25% to 2% hydroethyl-alkylene-imidazoline.

Within the compositional ranges defined above, the proportions of binder, lubricant and, where appropriate, inhibitor are adapted, in a manner known per se, in order to obtain, after treatment, both the best tribological properties and the best corrosion protection.

In order to treat the metal surface, the composition prepared is then applied to this surface so as to form a liquid homogeneous layer which is then dried in order to remove almost all of the liquid water in this layer, at a low enough temperature to avoid any deterioration of the treatment components, especially of the pregelatinized starch.

In the so-called "dry" state, the temporary protective film thus obtained contains large amounts of water included in the composition of the film, especially in the pregelatinized starch.

Preferably, the application conditions are adapted so as to obtain a dry film having a surface density of between 1 and 2.5 g/m$^2$ approximately.

Below 1 g/m$^2$, it is difficult to obtain a film with a sufficiently uniform thickness and the corrosion protection is not always sufficiently well guaranteed.

Above 2.5 g/m$^2$, the film runs the risk of being more difficult to clean; there is also a risk of annoying occurrences of sticking when treated surfaces are stacked.

Thus, by using the composition according to the invention for treating bare steel surfaces, very good temporary corrosion protection and substantial improvement in tribological properties are obtained simultaneously; the dry treatment film is easy to clean.

In addition, the lubricator properties of the dry treatment film obtained using the composition according to the invention are maintained, even after being liberally sprayed with an aqueous oil emulsion of the type used for lubrication during drawing.

Finally, since the essential products of this treatment composition and of the dry film obtained after treatment are natural and biodegradable, this results in a significant advantage from the environmental standpoint.

Further advantages of the process of the invention will appear on reading the examples of the present invention which are given below without implying any limitation.

MATERIALS:

For the examples illustrating the invention, the treatment composition contains, unless otherwise indicated in the examples below:

1—as starch: pregelatinized potato starch, reference LAB 2431 or Pregeflo PJ20, which are sold by the company ROQUETTE; these starches differ by their particle size; both are modified by crosslinking; they are both soluble in water at room temperature in the proportions used for carrying out the invention;

2—as vegetable wax or oil, carnauba wax: a self-emulsifiable wax with the reference Cerax M33 or Cerax AO28, these being sold by the company BARLOCHER France; the melting point of the AO28 wax is between 80 and 85° C. while that of the M33 wax is between 62 and 67° C.; the low melting point of the M33 wax is explained by the presence, in this commercial product of approximately 10% of emulsifiers based on ethoxylated fatty alcohols and approximately 2 to 5% paraffin; these additives improve the conditioning of the wax in solid granule form and make it easier to emulsify it.

In the tests described below, unless otherwise indicated, the treatment compositions are applied to sheets of bare steel so as to form a 1 to 2 g/m² dry film.

METHODS:

1—"Hot-wet" Corrosion Test (or "FKW"):

The coupons to be tested are placed as they are in an environmental chamber, corresponding to the DIN 50017 standard and simulating the corrosion conditions of an outer turn of a coil of sheet metal or of a cut metal sheet during storage.

The environment cycle to which the coupon to be tested is subjected is as follows: 8 h at 40° C. and 95 to 100% relative humidity—16 h at 20° C. and 75% relative humidity.

The result of the test is obtained by noting the number of successive cycles before traces of corrosion appear on the coupon.

2—Friction or Lubrication Test:

For these tests, a plane-plane tribometer of conventional type is used.

Before the measurement, the pieces to be tested, already treated on the surface as the case may be, are oiled using a whole oil, reference 8021 from the company QUAKER; the grammage of oil deposited is about 2 g/m².

The oiled test pieces are then clamped with a clamping force $F_S$ between two small high-speed steel plates having an area 1 cm².

The friction coefficient k is measured while moving the test piece at a constant speed V with respect to the small plates over a total distance D of 180 mm, while progressively increasing the clamping force $F_S$ from 200 daN at the start of the test to 2000 daN at the end of the test.

The pull speed V is 10 mm/s, unless otherwise specified.

The curve showing the variation in friction coefficient k as a function of time or of the clamping force $F_S$ is generally a decreasing curve, but more rarely a constant curve; in order to evaluate the tribological performance, the friction coefficient is generally measured at the end of travel, for $F_S \approx 1800$ daN.

3—Test for Compatibility with the Soluble Oils:

This is a test for checking that the lubricating properties of the dry treatment film obtained using the composition according to the invention are maintained, even after liberally spraying it with an aqueous oil emulsion of the type used for lubrication during drawing.

These aqueous emulsions or solutions are used to lubricate but also to cool the drawing tools, especially when the rates are high; it is therefore necessary to check that, by liberally dousing a surface treated according to the invention with an aqueous drawing emulsion or solution, the tribological properties of the dry film resulting from the treatment do not deteriorate, for example by leaching or by forming soaps, to the point of even causing seizure.

For this test, the soluble oil referenced 72CC from the company QUAKER is used, the oil being diluted to 10% with water, and then the friction measurement corresponding to Test 2 above is carried out directly, without reoiling.

The friction measurement therefore gives an indication of the retention or lack of retention of the lubricating properties provided by the dry film.

4—Cleanability Test:

Water at 50–60° C. and at 1 to 3×10⁵ Pa is sprayed for 1 to 3 minutes onto a treated specimen provided with a dry film.

After this cleaning operation, the treated surface is examined; disappearance of the dry film means good cleanability.

EXAMPLE 1

Comparison of the Performance Obtained Using the Compositions According to the Invention with that Obtained Using the Likewise Starch-based Compositions of the Prior Art A dry film of pregelatinized starch by itself, applied to a steel surface, provides no effective corrosion protection and may even, on the contrary, accelerate corrosion; incorporation of a plasticizer into this film is therefore necessary in order to obtain significant corrosion protection.

For this purpose, several types of vegetable oils and waxes were added as an emulsion to pregelatinized starch solutions:

1—according to the invention: sunflower oil, soybean oil, carnauba wax, candelilla oil and jojoba wax;

2—outside the scope of the invention: polyethylene wax and polypropylene wax.

The treatment compositions obtained were tested according to Protocols 1 and 2 of the above METHODS paragraph; the corrosion results obtained according to Test 1 (number of FKW cycles) and the friction results obtained according to Test 2 (friction coefficient) have shown that:

only the compositions containing a plant-based wax or oil (Case 1) make it possible to improve both the tribological properties and the corrosion resistance in a wet environment;

carnauba wax, candelilla oil and/or jojoba wax provide the best results.

The dry films obtained from the compositions containing an oil or wax in emulsion are easy to clean according to Protocol 4 of the METHODS paragraph above.

As indicated in Table II with regard to the carnauba wax or the triglyceride of cerotic acid, these results demonstrate an important synergy between the two essential components of the treatment composition (pregelatinized starch and plant wax/oil), both from the standpoint of corrosion resistance and of tribological properties.

TABLE II

Synergies between pregelatinized starch and plant wax/oil

| Composition of the dry film | FKW cycles | Friction coefficient |
|---|---|---|
| Binder alone: pregelatinized starch | <1 | 0.28 |
| Lubricant alone: Cerax M33 carnauba wax | 1 | — |
| Binder + Cerax M33 lubricant | 2 to 3 | 0.10 |

By way of comparison, the friction coefficient measured on an untreated steel test piece which is only oiled is approximately 0.14.

It may therefore be seen that the treatment according to the invention provides both a prelubricating effect and effective corrosion protection in a wet atmosphere, while the treatment composition used contains no crosslinking agent and is applied with a surface density substantially less than 100 g/m$^2$.

EXAMPLE 2

Comparison of the Performance Obtained Using the Compositions According to the Invention with Various Types of Starch Various types of starch were tested:
- unmodified native potato starch, like the product referenced Farina GP from Groupe ARNAUD;
- soluble, modified and pregelatinized potato starch, such as the product referenced LAB2431 or PJ20 from the company ROQUETTE, containing between 15 and 25% amylose;
- waxy, crosslinked and pregelatinized maize starch, such as the product Dexylose H235 from the company ROQUETTE, containing less than 5% amylose;
- soluble corn starch having a high amylose content, such as the product Supranyl 110 sold in France by LAMBERT RIVIERE, containing between 30 and 35% amylose.

Preferably, treatment compositions containing modified and pregelatinized potato starch or crosslinked and pregelatinized maize starch are used since they make it possible to obtain homogeneous dry films with a low surface density of between 1 and 2.5 g/m$^2$ more easily. In particular, the use of pregelatinized starches makes it possible to obtain solutions which are more fluid than those obtained with unmodified native starches: this is because, in the case of the latter starches, they are dissolved hot (>80° C.) and in the presence of an enzyme and an enzyme inhibitor, and, during cooling, the gelatinization and gelling phenomena are accompanied by a large increase in the viscosity, thereby making it impossible to obtain the films with the desired small thickness.

In order to obtain dry films which are thin and homogeneous, it has been found that the necessary starch weight concentration in the composition was:
- from 2 to 3% in the case of the above pregelatinized potato starch, containing between 15 and 25% amylose;
- from 5 to 7% in the case of the above pregelatinized maize starch, containing less than 5% amylose.

Moreover, to avoid the so-called flash-rust phenomenon, it is preferred to use compositions whose pH lies between 6.5 and 8, either naturally or by adjustment.

The so-called flash-rust phenomenon is a rapid corrosion phenomenon occurring (in a few seconds) when a reactive metal surface is brought into contact with an aqueous, generally acid, solution: this phenomenon is well known to formulators of water-based paints and of acrylic solutions, hence the need to use inhibitors or to maintain the pH in a predetermined range.

To obtain dry, thin and homogeneous films, it is important for the composition to be sufficiently fluid and stable within the pH range required; preferably, starches are used which allow stable fluid compositions to be more easily obtained at a pH of between 6.5 and 8, such as potato starch.

EXAMPLE 3

Comparison of the Performance Obtained Using the Compositions According to the Invention Depending on Whether or Not they Contain Corrosion Inhibitors Starting from a reference composition comprising:
- 2.5% by weight of pregelatinized potato starch: LAB2431;
- 3% by weight of CERAX product based on carnauba wax, compositions are prepared, to which various corrosion inhibitors have been added, especially:
- a corrosion inhibitor based on a salt of benzothiazolylthiosuccinic acid: product Irgacor 252 from CIBA);
- a corrosion inhibitor based on an amine borate: the product RC305 from CRODA;
- a corrosion inhibitor based on N-oleolyl sarcosine or N-lauroyl sarcisine from the company JAN DEKKER;
- a corrosion inhibitor based on heptanoic acid;
- a corrosion inhibitor based on an alkylamine carboxylate: LAKELAND AMA from the company LAKELAND-ARNAUD;
- a corrosion inhibitor based on a hydroethyl-alkylene-imidazoline: LAKELAND 180H from the company LAKELAND-ARNAUD.

As previously, steel specimens are treated using these various treatment compositions to which at least one inhibitor has been added and the corrosion resistance provided by the dry film obtained on these specimens is evaluated:
- according to Test 1 above;
- according to a similar test called the "transport" test in which the coupons to be tested are placed in packets, in which they are clamped together in fours in an environmental chamber subjected to repetitions of the following environmental cycle: 10 h at 40° C. and 95% relative humidity—4 h at 20° and 85% relative humidity—10 h at −5° C. and 0% relative humidity —8 h at 30° C. and 85% relative humidity;
- by the electrochemical impedance measurements normally used for evaluating corrosion resistance.

According to these tests and measurements, the best results are obtained for the treatment compositions which contain:
- 0.5 to 3%, preferably 2%, by weight of an alkylamine carboxylate;
- 0.25 to 2%, preferably 1%, by weight of a hydroethyl-alkylene-imidazoline.

The results of the corrosion test (Test 1) and friction test (Test 2) obtained from these compositions are given in Table III; they demonstrate a significant synergy between the pregelatinized starch used as binder and the carnauba wax used as plasticizer and lubricant and the two preferred inhibitors: an alkylamine carboxylate and a hydroethyl-alkylene-imidazoline.

TABLE III (Pregelatinized starch - vegetable wax) + inhibitors synergies

| Composition of the dry film | FKW cycles | Friction coefficient |
|---|---|---|
| Pregelatinized starch + Carnauba Cerax M33, without inhibitors | 2–3 | 0.10 |
| Inhibitors alone: an alkylamine carboxylate and a hydroethyl-alkylene-imidazoline (2:1 ratio) | 2 | |
| Binder + Lubricant + Inhibitors: | | |
| - Cerax M33 | >13 | 0.075 |
| - Cerax AO28 | 8 | — |

The proportions of the various components in the composition must be adapted in order to obtain this synergy effect; in this case, with the components specified above, the optimum proportions are:

- 2 to 4%, preferably 2.5%, in the case of the pregelatinized starch;
- 1 to 5%, preferably 3%, in the case of the carnauba wax;
- 0.75 to 5% of alkylamine carboxylate/hydroethyl-alkylene-imidazoline mixture, preferably in a proportion of approximately 2:1.

By way of comparison, the friction coefficient measured on an untreated steel test piece which is only oiled is approximately 0.14: it may therefore be seen that the treatment according to the invention provides a prelubricating effect which is even more pronounced when the treatment composition contains an alkylamine carboxylate and a hydroethyl-alkylene-imidazoline.

The synergy effect is even greater with regard to corrosion resistance when a vegetable wax is used to which an emulsifier and a paraffin, such as Cerax M33 (as opposed to Cerax AO28), is added.

On the other hand, the use, instead of carnauba wax, of sunflower oil or oleic sunflower oil or ethoxylated sunflower oil has not made it possible to obtain as high a corrosion resistance.

What is claimed is:

1. An easily cleanable aqueous composition for treating a metal surface, said composition comprising, as an emulsion, at least 2% by weight of pregelatinized starch and at least 1% of vegetable wax or oil, or at least 1% of synthetic wax or oil having a composition identical to the composition of a vegetable oil or wax.

2. The composition according to claim 1, wherein said pregelatinized starch is crosslinked.

3. The composition according to either of claims 1 and 2, wherein said pregelatinized starch is a pregelatinized potato or maize starch.

4. The composition, according to claim 1, having a pH between 6.5 and 8.

5. The composition according to claim 1, wherein the weight content of the pregelatinized starch in said composition is less than or equal to 7%, and wherein the weight content of the oil or wax in said composition is less than or equal to 5%.

6. The composition according to claim 1, wherein said pregelatinized starch has an amylose content of less than or equal to 25%.

7. The composition according to claim 1, wherein said vegetable wax or oil is selected from the group consisting of carnauba wax, jojoba oil and candelilla wax, and mixtures thereof.

8. The composition according to claim 1, comprising at least one corrosion inhibitor.

9. The composition according to claim 8, wherein said corrosion inhibitor is selected from the group consisting of an alkylamine carboxylate and a hydroethyl-alkylene-imidazoline, and mixtures thereof.

10. The composition according to claim 9, wherein said corrosion inhibitor is a mixture of an alkylamine carboxylate and a hydroethyl-alkylene-imidazoline.

11. The composition according to claim 1, wherein said metal is steel.

12. The composition according to claim 10, wherein the alkylamine carboxylate and the hydroethyl-idkylene-imidazoline are in a proportion of approximately 2:1.

13. The composition according to claim 1, wherein the weight content of the pregelatinized starch in said composition is 2 to 7%.

14. A process for treating a metal surface using a composition according to claim 1, said process comprising the steps of:

applying a layer of said composition to said surface; and
then drying said layer so as to obtain a dry film having a surface density of between 1 and 2.5 g/m$^2$.

15. The process according to claim 14, wherein said metal surface is a steel surface.

16. The process according to claim 14, wherein the treating of said metal surface provides temporary corrosion protection of said surface.

17. The process according to claim 14 wherein the treating of said metal surface provides prelubrication of said surface.

18. The process according to claim 15, wherein the treating of said metal surface provides temporary corrosion protection of said surface.

19. The process according to claims 15, wherein the treating of said metal surface provides prelubrication of said surface.

* * * * *